United States Patent
Sieme

(10) Patent No.: US 9,115,861 B2
(45) Date of Patent: Aug. 25, 2015

(54) MODULE ASSEMBLY FOR ARRANGEMENT IN A HEADLAMP

(71) Applicant: Hella KGaA Hueck & Co., Lippstadt (DE)

(72) Inventor: Jörg Sieme, Georgsmarienhütte (DE)

(73) Assignee: Hella KGaA Hueck & Co., Lippstadt (DE)

( * ) Notice: Subject to any disclaimer, the term of this patent is extended or adjusted under 35 U.S.C. 154(b) by 0 days.

(21) Appl. No.: 14/259,245

(22) Filed: Apr. 23, 2014

(65) Prior Publication Data
US 2014/0321144 A1    Oct. 30, 2014

(30) Foreign Application Priority Data

Apr. 25, 2013   (DE) .......................... 10 2013 104 190

(51) Int. Cl.
*F21S 8/10*    (2006.01)
*B60Q 1/068*    (2006.01)

(52) U.S. Cl.
CPC ............. *F21S 48/328* (2013.01); *B60Q 1/0683* (2013.01); *F21S 48/1104* (2013.01); *F21S 48/1159* (2013.01); *F21S 48/1305* (2013.01)

(58) Field of Classification Search
USPC ......... 362/508, 523, 529, 532, 544, 545, 547, 362/548, 549, 285, 287
See application file for complete search history.

(56) References Cited

U.S. PATENT DOCUMENTS

2011/0013397 A1*   1/2011   Catone et al. ................. 362/244
2013/0329443 A1*   12/2013  Yasuda ......................... 362/516

FOREIGN PATENT DOCUMENTS

| DE | 539442 C | 11/1931 |
|----|----------|---------|
| DE | 102005002774 A1 | 8/2005 |
| DE | 102006051030 A1 | 5/2007 |
| DE | 102008061526 A1 | 6/2010 |

* cited by examiner

*Primary Examiner* — Laura Tso
(74) *Attorney, Agent, or Firm* — Husch Blackwell LLP

(57) ABSTRACT

A module assembly (1) for arrangement in a headlamp of a vehicle with a carrier frame (10) on which at least one light module (11) is supported. The light module (11) comprises at least one heat sink (12) on which at least one semiconductor light source (13) is supported for the emission of light (14). Two mounting journals (16) extending in a common axis (15) are arranged on the heat sink (12), so that the light module (11) can pivot about the axis (15) on the carrier frame (10). The light module (11) has a clamping unit (17) with which the light module (11) can be clamped in its pivot position about the axis (15) on the carrier frame (10).

10 Claims, 4 Drawing Sheets

MODULE ASSEMBLY FOR ARRANGEMENT IN A HEADLAMP

CROSS REFERENCE

This application claims priority to German Patent Application No. 10 2013 104190.6 filed Apr. 25, 2013, and hereby incorporates this document by reference.

TECHNICAL FIELD OF THE INVENTION

The present invention relates to a module assembly for arrangement in a headlamp of a vehicle with a carrier frame on which at least one light module is supported, wherein the light module comprises at least one heat sink on which at least one semiconductor light source is supported for the emission of light.

BACKGROUND OF THE INVENTION

Module assemblies usually comprise several light modules that are supported together on one carrier frame, wherein the carrier frame is held so that it can be moved in the housing of the headlamp. The light provided by the headlamp forms a light field with a certain light distribution formed by the interaction of several light modules. Thus, for example, two light modules for forming the light in the area in front of the vehicle, another light module for forming a base light, one light module for symmetric range lighting, and another light module for asymmetric range lighting are arranged on one carrier frame. In addition, for example, one light module for bend lighting can be supported on the carrier frame.

For especially the one-time adjustment of the module assembly, it is necessary to adjust the individual light modules on the carrier frame and to secure the adjusted position of the light modules on the carrier frame. For this purpose, there are several structural approaches that often, however, comprise additional bracket frames and consequently are subject to tolerances.

For example, US 2010/0208483 A1 discloses a light module that can be arranged by means of mounting journals on a carrier frame in a headlamp of a vehicle. For adjusting the light module, several holding points are provided in order to align the light module in space, so that the part of the light field provided by the light module can be directed in front of the vehicle. Through the plurality of mounting journals and the resulting adjustment capabilities, however, it is possible only with difficulty to orient the light module in the required position in the housing of the headlamp.

US 2009/0303726 A1 shows a module assembly for the arrangement in a headlamp of a vehicle with a carrier frame on which a light module is supported and the light module has a heat sink on which a semiconductor light source is arranged for the emission of light. On the back side, the heat sink has several cooling ribs for cooling the semiconductor light source. The light emitted by the semiconductor light source is guided through a separate lens and the heat sink is supported in the carrier frame by means of three screw points. By adjusting the screws in the screw points, the position of the heat sink, together with the semiconductor light source, can be adjusted relative to the lens. The screw elements in the screw points here have adjustment axes that run parallel to each other. Thus, an adjustment of the light module in the spatial position in the headlamp is indeed enabled, but through the three-point mounting of the light module on the carrier frame, when one of the mounting points is adjusted, a positional adjustment both in a first direction and also in a second direction is produced, so that the adjustment of the light module on the carrier frame in the headlamp is complicated and is possible only by a trained person.

U.S. Pat. No. 7,972,049 B2 discloses a light module with a heat sink on which a semiconductor light source is arranged and a reflector can be attached to the heat sink by means of two screw elements. Here, the connection points between the reflector and the heat sink have adjustment ramps and the reflector can be rotated about an axis according to the rotation of the adjustment ramps, in order to be aligned relative to the semiconductor light source. The entire light module, however, can only be arranged rigidly on a carrier frame in the headlamp.

Finally, U.S. Pat. No. 7,798,690 B2 discloses a module assembly for arrangement in a headlamp with a carrier frame on which several light modules are supported, wherein the light modules are arranged rigidly on the carrier frame. The carrier frame can be adjusted as a whole in the housing of the headlamp, but the ability to adjust the individual light modules relative to each other and to the carrier frame is not provided, with the result that the carrier frame itself forms the bracket means for supporting the semiconductor light source through corresponding structural sections that are formed in one piece with the carrier frame.

SUMMARY OF THE INVENTION

The problem of the invention is to improve known module assemblies for arrangement in a headlamp of a vehicle with a carrier frame on which several light modules are supported, wherein these light modules are adjustable in their position on the carrier frame in a simple way. In particular, there is the problem of supporting the light modules on the carrier frame in a direct arrangement, so that additional adjustment elements can be eliminated. In particular, the problem is to enable the adjustment of the light modules on the carrier frame through the adjustment of only one single connection point.

This problem is solved with characterizing features starting with a module assembly for arrangement in a headlamp of a vehicle according to the preamble of claim 1 and also starting with a headlamp according to claim 10. Expedient further improvements of the invention are indicated in the dependent claims.

The invention includes the technical teaching that two mounting journals extending in a common axis are arranged on the heat sink, so that the light module can pivot on the carrier frame by means of the mounting journals about the axis, and wherein the light module has a clamping unit with which the light module can be clamped in its pivot position about the axis on the carrier frame.

According to the invention, the light module can thus be adjusted on the carrier frame with one degree of freedom, in which the light module can be pivoted with the heat sink and the semiconductor light source about the axis on the carrier frame that is defined by the two mounting journals. The mounting journals can be arranged preferably on the heat sink and can be formed especially by sections of the heat sink, wherein it is especially advantageous for the axis to run through the center of gravity of the entire light module. This arrangement produces no mechanical loads in the clamping unit, for example, for a dynamic loading of the headlamp during operation of the vehicle. The light module can be tilted about the axis by a manual action until the emitted light assumes the desired direction. Then the clamping unit can be activated, in order to fix the rotational position of the light module about the axis by the clamping of the clamping unit on the carrier frame.

According to one advantageous embodiment, the light module can comprise a reflector that is arranged, in particular, on the heat sink and can be pivoted with this heat sink about the axis. The arrangement of the reflector on the heat sink can be rigid, i.e., fixed in place, and the light module forms one rigid unit with the heat sink, the semiconductor light source, and the reflector and this unit can be pivoted about the axis.

The carrier frame can comprise a mounting section for connecting the clamping unit. If several light modules are supported on the carrier frame, then several mounting sections can be provided on the carrier frame, so that one mounting section can be allocated to each light module. The mounting section can have, at least in some sections, a curvature with a radius that is constant about the axis. Thus the clamping unit can be fixed in different positions on the mounting section, without the clamping unit having to be adjusted as a function of the rotational position of the light module about the axis.

The clamping unit can have a first clamping jaw and a second clamping jaw, wherein the first clamping jaw can be arranged on the inside of the curve and wherein the second clamping jaw can be arranged on the outside of the curve on the mounting section. If the desired position of the light module on the carrier frame has been set, for example, through manual tilting of the light module and the axis, and if the clamping unit with the clamping jaws has a certain position on the mounting section, then the clamping jaws can be tensioned against each other, in particular, by a screw means, whereby the clamping unit is fixed on the mounting section. As a result, the rotational position of the light module about the axis is fixed, so that the position of the light module is defined in its arrangement on the carrier frame.

The light module can have, in particular, a mounting pin arranged on the heat sink, wherein the first clamping jaw can be supported on this pin so that it can be moved. In this way it is achieved that no mechanical stresses can be applied between the clamping unit as a fixed point of the light module and the axis as the rotational axis for the light module, because longitudinal compensation can be performed in which the first clamping jaw can slide over the mounting pin. The screw means with which the second clamping jaw can be tensioned onto the first clamping jaw can be screwed into a boss, wherein the boss can extend through the mounting section on the carrier frame. In this way, the mounting section can have an elongated slot through which the boss extends. Through the elongated formation of the elongated slot, the clamping unit can be fixed at different positions on the mounting section of the carrier frame through rotation of the light module about the axis. The screw means that can be screwed into the boss can extend in the same direction as the mounting pin on the light module that extends in the first clamping jaw.

Advantageously, the holding arrangement of the heat sink on the carrier frame by means of the mounting journals can comprise bearing elements, wherein the bearing elements form a bearing mount for the mounting journals and are arranged, in particular, with screw elements on the heat sink. The bearing elements can be made from a duroplastic material, wherein the heat sink can be made from a material of high heat conductivity, for example, aluminum. The mounting journals are formed in one piece with the heat sink in that these are molded, for example, on the heat sink, so that an advantageous friction pair is formed between the mounting journals made from an aluminum material and the bearing elements made from a Duroplast. The bearing elements can be tightened on the carrier frame, for example, with a screw element, whereby, in particular, an advantageous installation sequence is enabled, because the bearing elements can be initially arranged on the mounting journals on the heat sink, in order for these to then be fastened on the carrier frame with the screw elements.

According to one advantageous improvement, the light module can comprise an air guiding element that is arranged, in particular, on the heat sink. The heat sink can comprise cooling ribs and the air guiding element can be arranged on the heat sink so that this promotes an air flow through the cooling ribs of the heat sink. Especially when convection is established in the headlamp or active ventilation is provided, an air flow can be guided in an especially effective way with the air guiding element on the heat sink, especially on the cooling ribs. Thus, the air guiding element can be attached as a structural unit on the light module and likewise can be pivoted about the axis on the carrier frame.

The module assembly can comprise a carrier frame and several light modules, wherein the light modules can form different parts of a light field that is provided by the headlamp. Light modules that are arranged on the carrier frame according to the invention can form, for example, light module for the light in the area in front of the vehicle, a base light module, or, for example, a light module for asymmetric range lighting.

The present invention further relates to a headlamp with a module assembly that has a carrier frame with at least one light module, wherein the light module is formed according to the description above and is arranged and can be adjusted on the carrier frame according to the invention. Here the position of the carrier frame in the headlamp can be moved and/or adjusted by means of a tilting mechanism.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, wellknown methods, procedures, and components have not been described in detail so as not to obscure the present invention.

Figure 1:
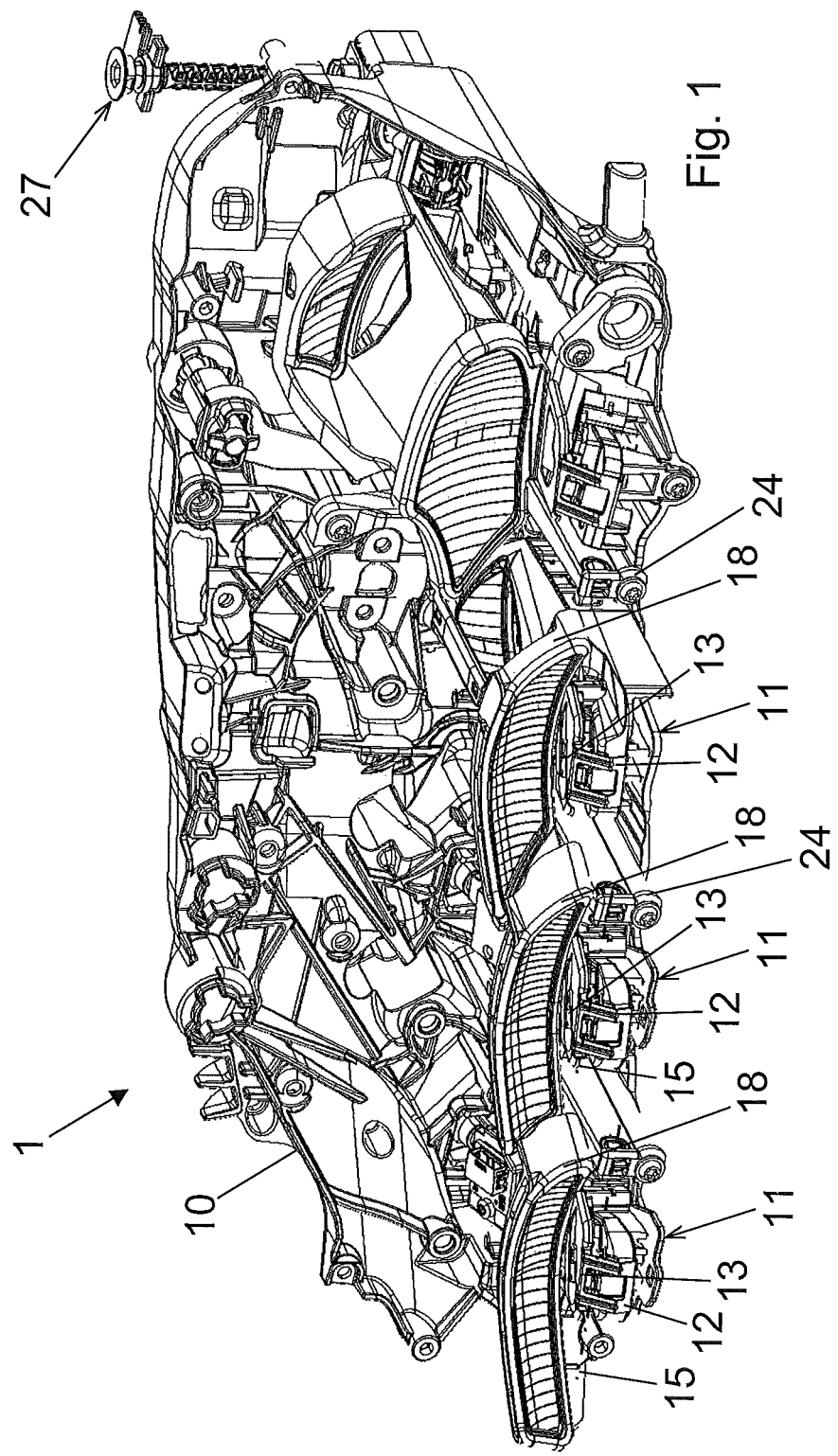
FIG. 1: a view of a module assembly with a carrier frame on which several light modules are arranged.

FIG. 1 shows a module assembly 1 with a carrier frame 10 and how this can be inserted into the housing of a headlamp for a vehicle. Several light modules 11 are arranged on the carrier frame 10 and, for example, the light modules 11 can be used for the illumination of a first and a second area in front of the vehicle and, for example, for the preparation of a base light portion of a light distribution that is generated by the headlamp.

The light modules 11 comprise heat sinks 12. Semiconductor light sources 13 that are not shown in more detail are supported on the heat sinks 12. Furthermore, reflectors 18 are located on the light modules 11 in order to reflect and shape the light emitted by the semiconductor light sources 13 accordingly.

The arrangement on the carrier frame 10 is shown in more detail, for example, on a light module 11. Bearing elements 24 that support the light module 11 by means of mounting journals that are formed on the heat sink 12 of the light module 11 are used for connecting the light modules 11 to the carrier frame 10. The mounting journals define an axis 15 about which the light module 11 can be tilted on the carrier frame 10, in order to adjust the height of the light emitted by the light module 11. For each light module 11 that is supported on the carrier frame 10, this adjustment can be performed separately, wherein the position of the entire carrier frame 10 in the headlamp can also be changed by means of a tilting mechanism 27, whereby the position of the light modules 11 relative to the carrier frame 10 remains unchanged.

Figure 2:
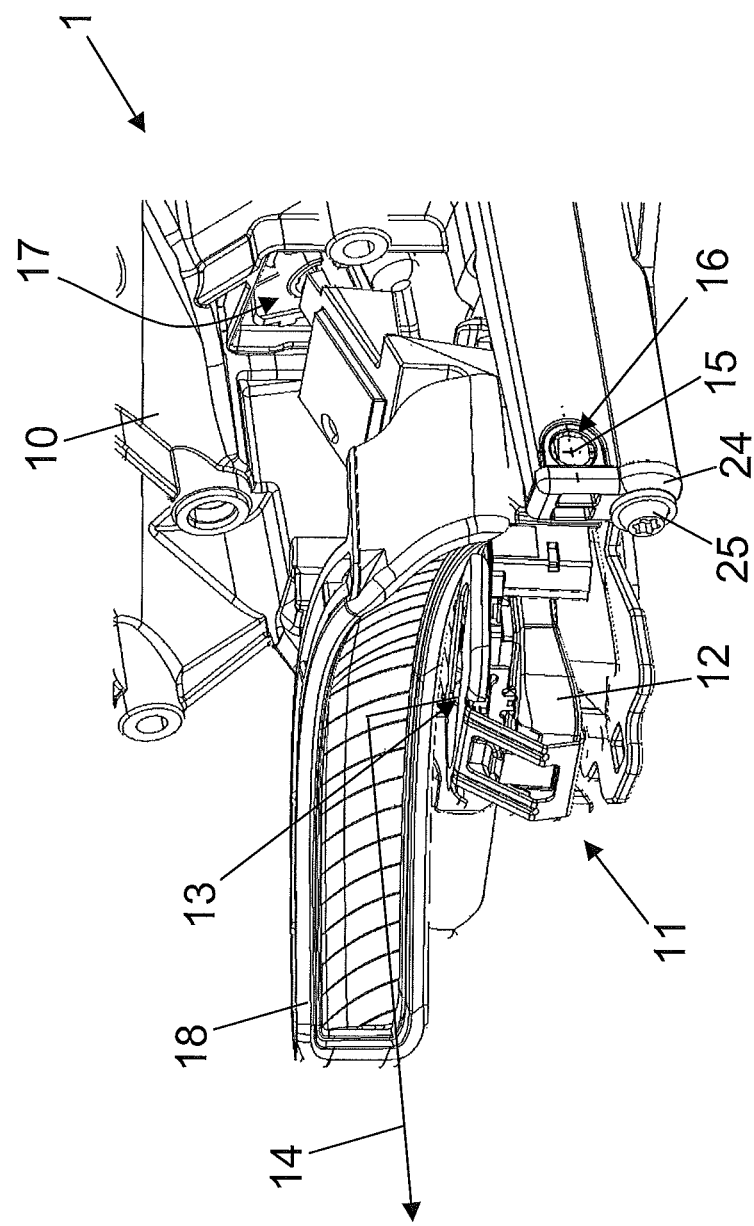
FIG. 2: a detail view of the arrangement of a light module in an arrangement on the carrier frame of the module assembly.

In one detailed view, FIG. 2 shows the arrangement of a light module 11 on the carrier frame 10 and the light module 11 has a base body that simultaneously forms a heat sink 12 in order to support a semiconductor light source 13 and to dissipate heat. A reflector 18 is further arranged on the heat sink 12 and light 14 that is emitted by the semiconductor light source 13 in the direction toward the reflector 18 can be reflected in a desired way on the reflector 18 and exit the light module 11.

Two mounting journals 16 extending in a common axis 15 are arranged on the heat sink 12. A front mounting journal 16 is visible in the perspective view. Through the extension directions of the two mounting journals 16, an axis 15 is defined that runs through the mounting journals 16 and the light module 11 can be tilted about this axis on the carrier frame 10.

The mounting of the heat sink 12 by means of the mounting journals 16 is realized by means of bearing elements 24 that are made from a duroplastic material and are fixed on the carrier frame 10 with screw elements 25. The bearing elements 24 form bearing rings into which the mounting journals 16 of the light module 11 extend.

If the light module 11 is adjusted in the rotation about the axis 15, then a clamping unit 17 can be activated with which the position of the light module 11 on the carrier frame 10 can be fixed. Consequently, the light module 11 can be adjusted and then the clamping unit 17 can be activated in order to maintain the adjusted position of the light module 11 for the later operation of the headlamp. In the following FIG. 3, the shape of the clamping unit 17 is shown in more detail in a section view.

Figure 3:
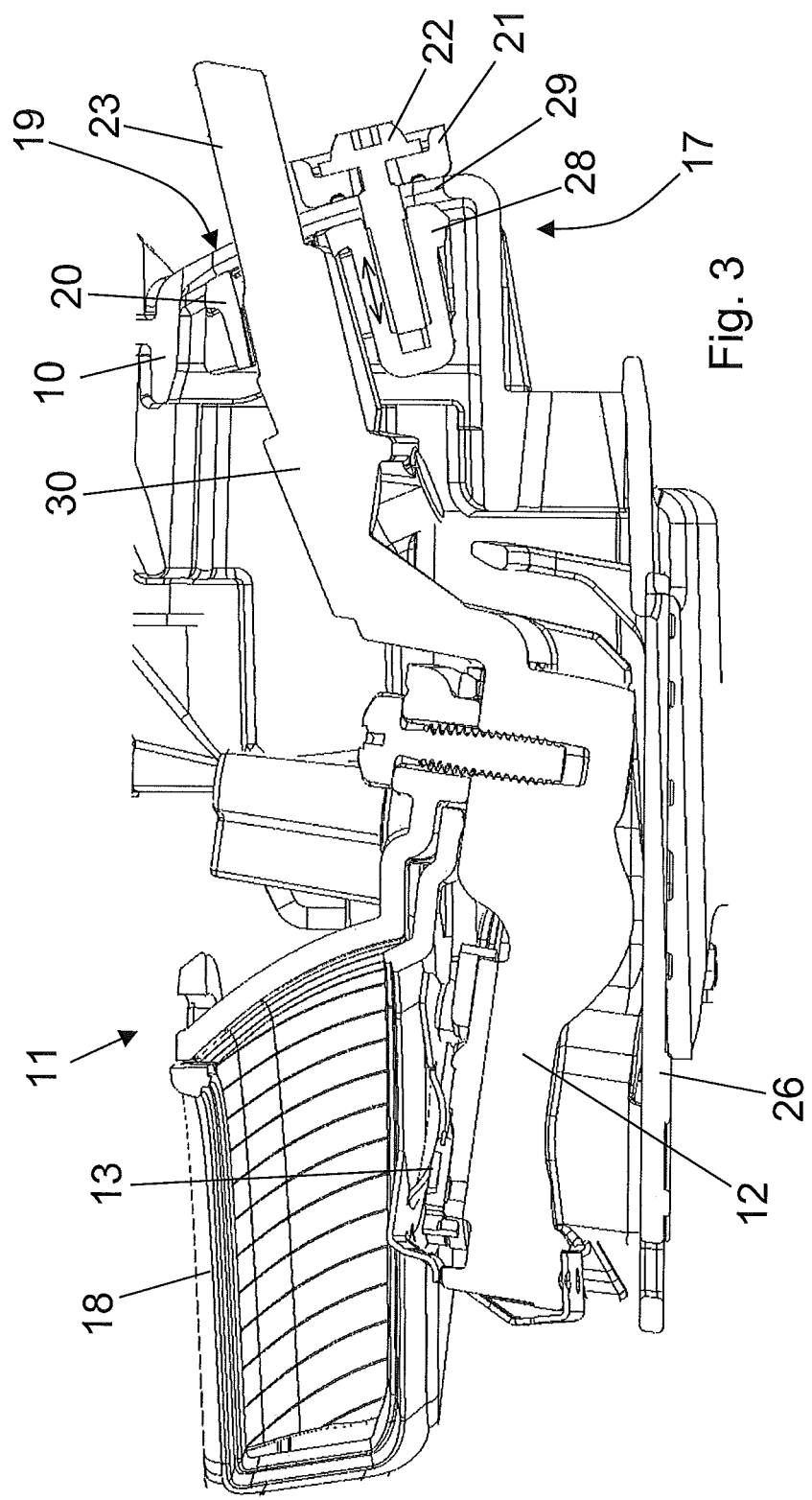
FIG. 3: a cross-sectional view of a light module, wherein the carrier frame is shown in the arrangement on the carrier frame of the module assembly in the area of a mounting section.

FIG. 3 shows, in a cross-sectioned view, the light module 11 with the clamping unit 17 by means of which the light module 11 can be fixed on the carrier frame 10 in its rotational position about the axis 15. The heat sink 12 is constructed as an aluminum cast component and has a support arm 30 that extends in the direction of a mounting section 19 of the carrier frame 10. The support arm 30 opens in a mounting pin 23 and a first clamping jaw 20 is supported on the mounting pin 23 so that it can move, as indicated by a double arrow. With the first clamping jaw 20, a second clamping jaw 21 can be tensioned by means of a screw means 22 in which the screw means 22 are screwed in and tightened in the shown way in a boss 28 and the boss 28 is molded on the first clamping jaw 20.

If the adjustment of the light module 11 takes place, for example, through manual pivoting of the light module 11 about the axis 15, then the second clamping jaw 21 can be tensioned with the first clamping jaw 20 by tightening the screw means 22 in the boss 28. The screw means 22 extends through an elongated slot 29 that is formed in the mounting section 19 of the carrier frame 10. By tensioning the two clamping jaws 20 and 21 against each other with the screw means 22, the position of the light module 11 on the carrier frame 10 is fixed. Therefore, because the first clamping jaw 20 is held on the mounting pin 23 so that it can move back and forth, no stresses are produced between the mounting of the light module 11 on the axis 15, which is not shown here, and the fixing on the carrier frame 10 by means of the clamping unit 17.

On the bottom side of the heat sink 12, an air guiding element 26 is shown, so that an air flow 32, for example, from the direction of the carrier frame 10, can flow through the heat sink 12 formed with cooling ribs, in order to heat the heat sink while simultaneously, for example, dissipating heat from the heat sink 12 and, for example, directing a flow on the inside, for example, to a lens of a headlamp, in order to deice or defrost the lens.

Figure 4:
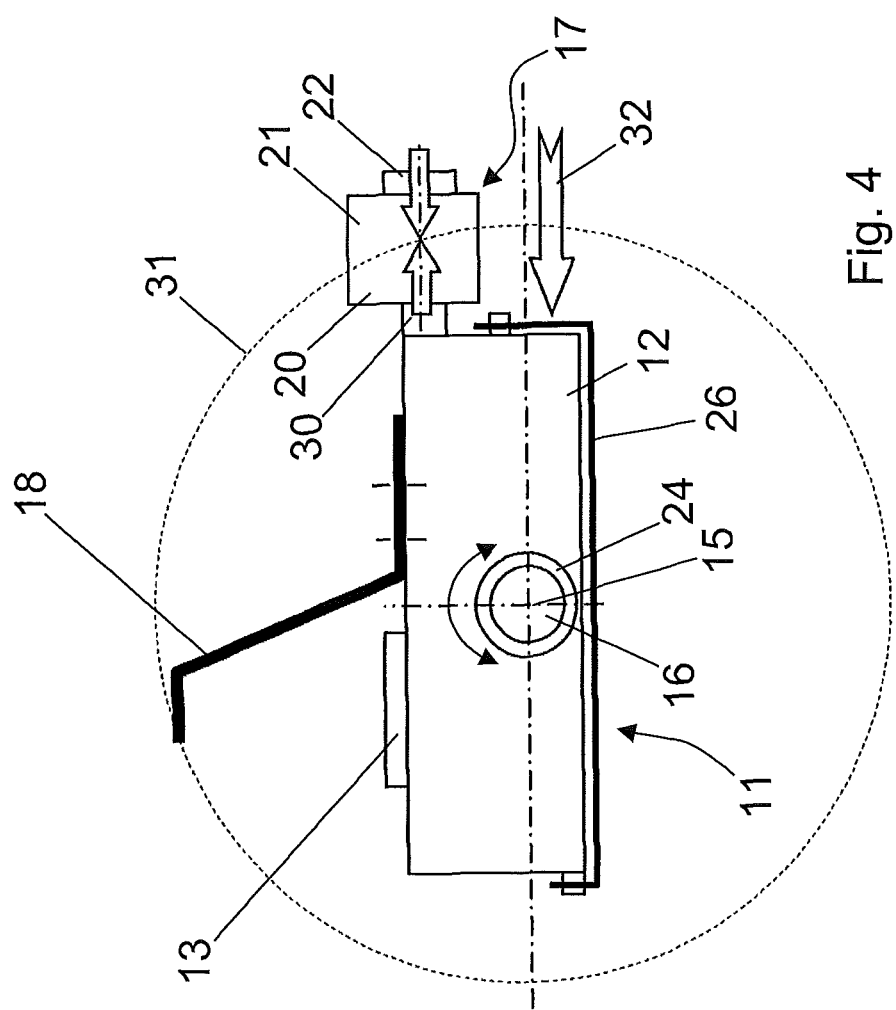
FIG. 4: a schematic view of an arrangement of a light module on a carrier frame.

FIG. 4 finally shows, in a schematic view, the light module 11 with the heat sink 12, the semiconductor light source 13, and the reflector 18, wherein the air guiding element 26 is shown arranged on the bottom side on the heat sink 12. The heat sink 12 can pivot about the shown mounting journal 16, as indicated by a double arrow, and the mounting journal 16 is supported in the schematically shown bearing element 24 so that it can rotate about the axis 15.

The support arm 30 connects the heat sink 12 to the clamping unit 17 that is formed essentially from the first clamping jaw 20 and the second clamping jaw 21, wherein the second clamping jaw 21 can be tensioned against the first clamping jaw 20 by means of the shown screw means 22.

If the light module 11 is rotated about the axis 15 and if the light module 11 reaches a desired rotational position, by screwing the screw means 22 with the first clamping jaw 21, the clamping unit 17 can be activated, so that the clamping unit 17 can be fixed at a corresponding position on the adjustment circle 31 that extends about the axis 15. The fixing effect is indicated by two compressive force arrows and the clamping jaws 20 and 21 are each pressed against the inside and the outside, respectively, of the mounting section 19 on the carrier frame 10.

The center of gravity of the light module 11 is on the axis 15, whereby no tilting moments are exerted on the clamping unit 17 also during operation of the headlamp, for example, if there are vibrations in the headlamp in the vehicle. Therefore, in an especially advantageous way, a positionally stable arrangement of the light module 11 on the carrier frame 10 is produced, wherein the position of the light module 11 can be adjusted and fixed in a simple way.

The invention is not restricted in its design solely to the preferred embodiment indicated above. On the contrary, a number of variants is conceivable that use the solution as described above, even on designs that are fundamentally different. All of the features and/or advantages emerging from the claims, the description, or the drawings, including structural details, spatial arrangements, and processing steps, can be considered essential for the invention both by themselves and also in different combinations.

LIST OF REFERENCE SYMBOLS

1 Module assembly
10 Carrier frame
11 Light module
12 Heat sink
13 Semiconductor light source
14 Light
15 Axis
16 Mounting journal
17 Clamping unit
18 Reflector
19 Mounting section
20 First clamping jaw
21 Second clamping jaw
22 Screw means
23 Mounting pin
24 Bearing element
25 Screw element
26 Air guiding element
27 Tilting mechanism
28 Boss
29 Elongated slot
30 Support arm
31 Adjustment circle
32 Air flow

The invention claimed is:

1. A module assembly for arrangement in a headlamp of a vehicle with a carrier frame comprising:
at least one light module supported on the carrier frame, wherein the light module comprises at least one heat sink on which at least one semiconductor light source is supported for the emission of light,
two mounting journals extending in a common axis are arranged on the heat sink, so that the light module can pivot by means of the mounting journals about the axis on the carrier frame,
and wherein the light module has a clamping unit with which the light module can be clamped in its pivot position about the axis on the carrier frame.

2. The module assembly according to claim 1, wherein the light module comprises a reflector that is arranged on the heat sink and can be pivoted with this heat sink about the axis.

3. The module assembly according to claim 1, wherein the carrier frame comprises a mounting section for connecting the clamping unit, wherein the mounting section has at least in some sections a curvature with a constant radius about the axis.

4. The module assembly according to claim 1, wherein the clamping unit has a first clamping jaw and a second clamping jaw, wherein the first clamping jaw is arranged on the inside of the curve and wherein the second clamping jaw is arranged on the outside of the curve on the mounting section and wherein the clamping jaws can be tensioned against each other, in particular, by a screw means.

5. The module assembly according to claim 4, wherein the light module and especially the heat sink have a mounting pin on which the first clamping jaw is mounted so that it can be moved.

6. The module assembly according to claim 1 wherein the holding arrangement of the heat sink on the carrier frame comprises bearing elements by means of mounting journals, wherein the bearing elements form a bearing mount for the mounting journals and are arranged especially with screw elements on the heat sink.

7. The module assembly according to claim 1 wherein at least one of: the bearing elements comprise a duroplastic material, and the heat sink is formed from aluminum.

8. The module assembly according to claim 1 wherein the light module has an air guiding element that is arranged on the heat sink.

9. The module assembly according to claim 1, comprising several light modules that are formed for the at least partial formation of at least one of a low beam and high beam of the headlamp.

10. A headlamp with a module assembly according to claim 1, wherein the position of the carrier frame can be adjusted in the headlamp by means of a tilting mechanism.

* * * * *